Feb. 21, 1967  C. M. BROWNE ET AL  3,305,336
METHOD AND APPARATUS FOR FORMING A FILM ON A GLASS SURFACE
Filed Oct. 5, 1964  8 Sheets-Sheet 1
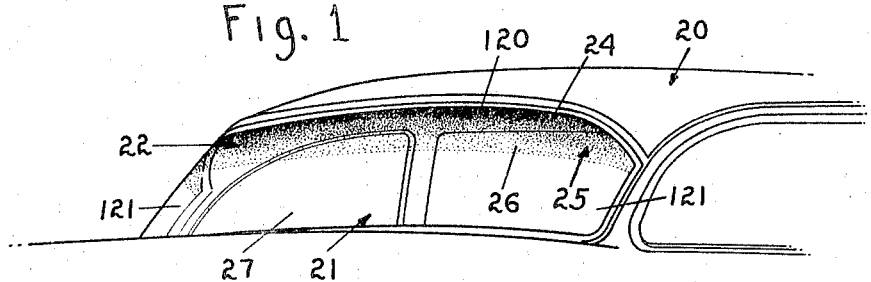
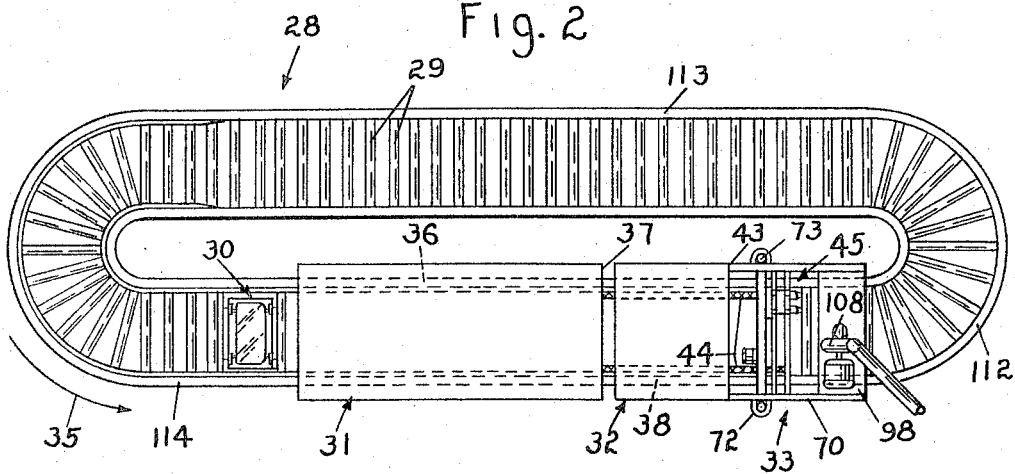
INVENTORS
Charles M. Browne and
BY Robert R. Beckham
Nobbe & Swope
ATTORNEYS

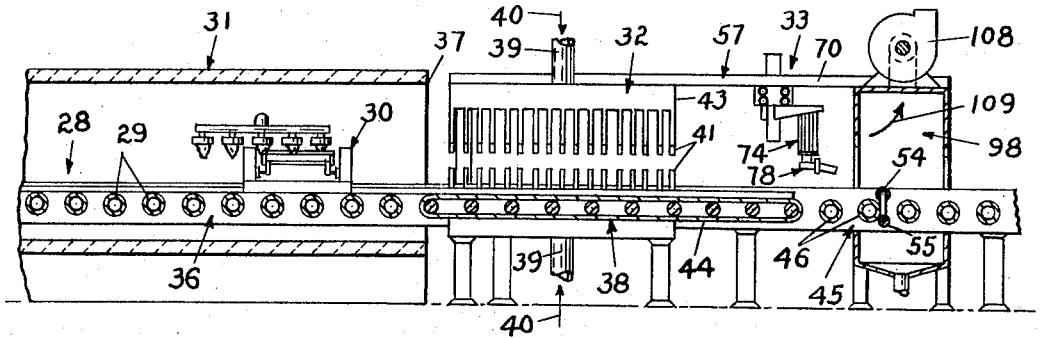
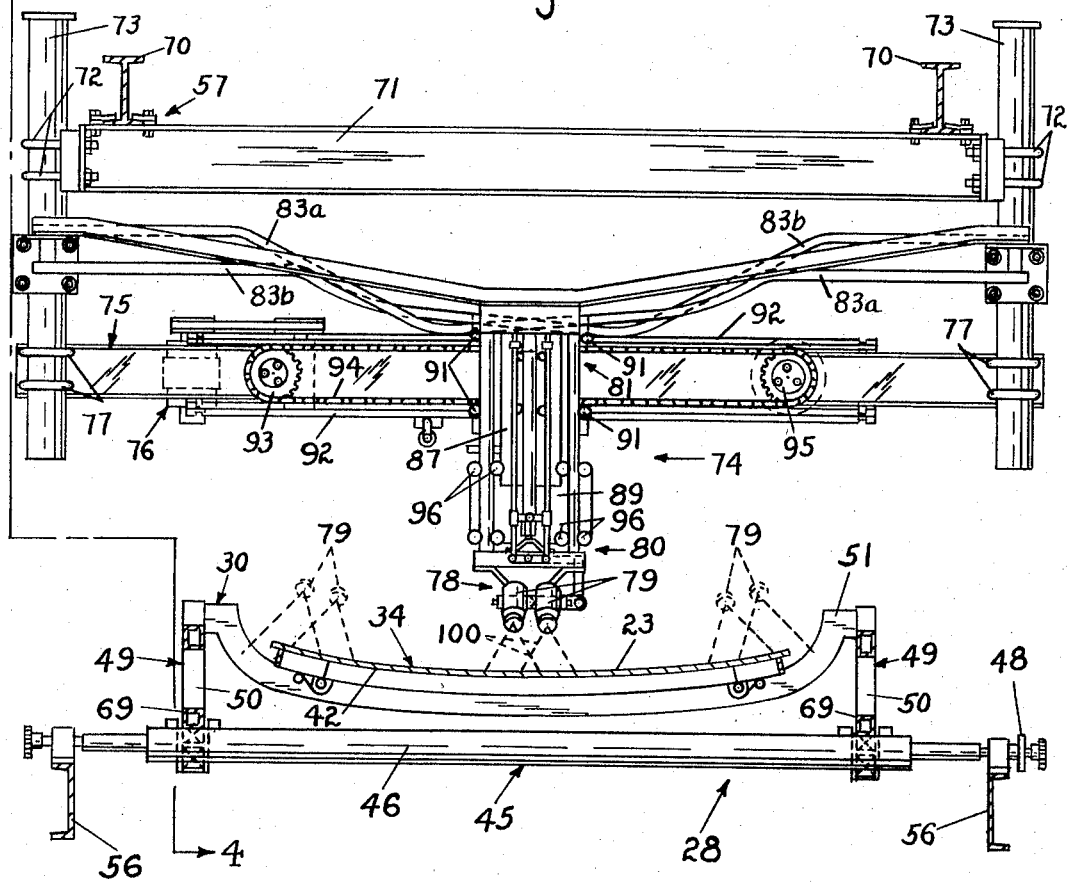

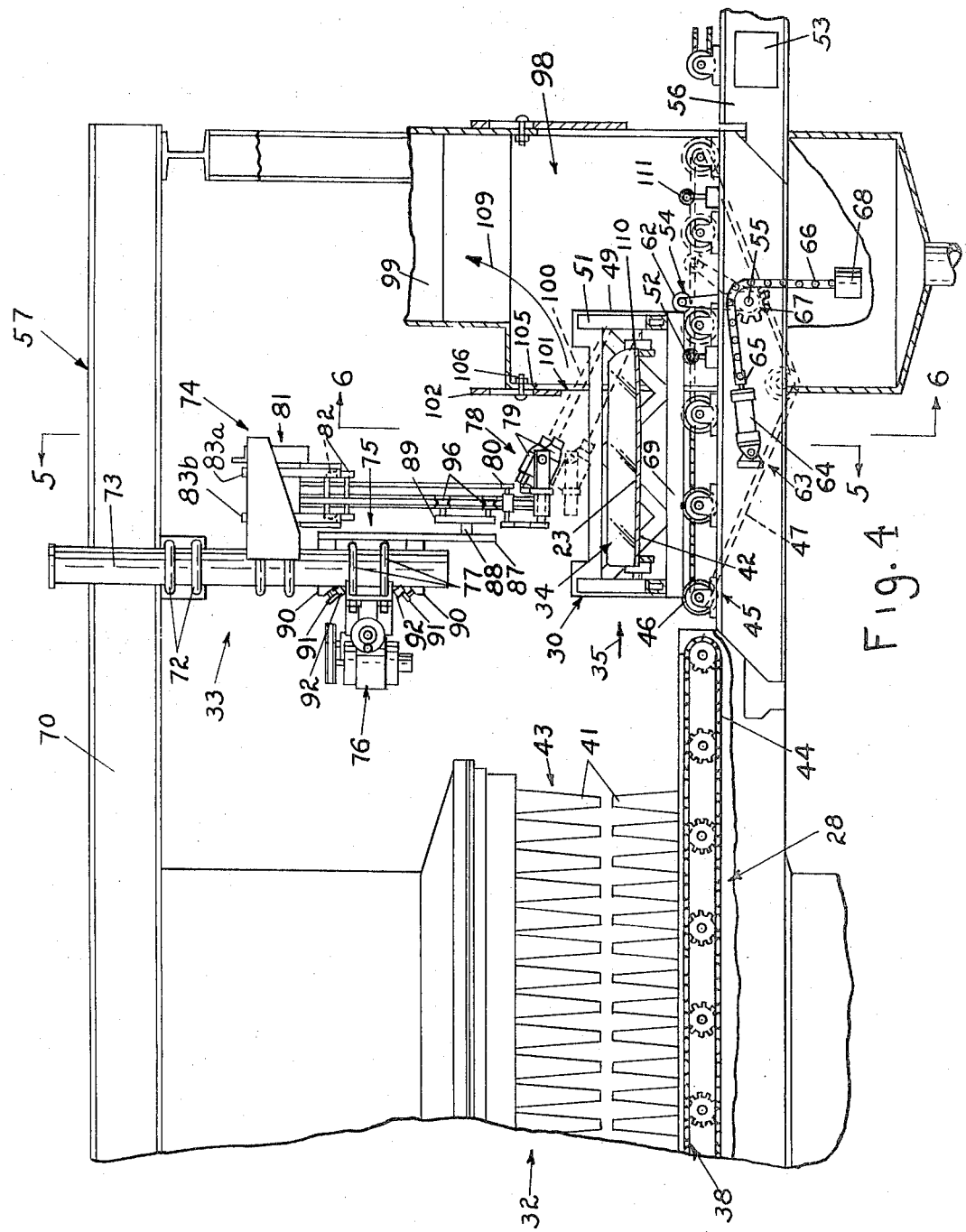

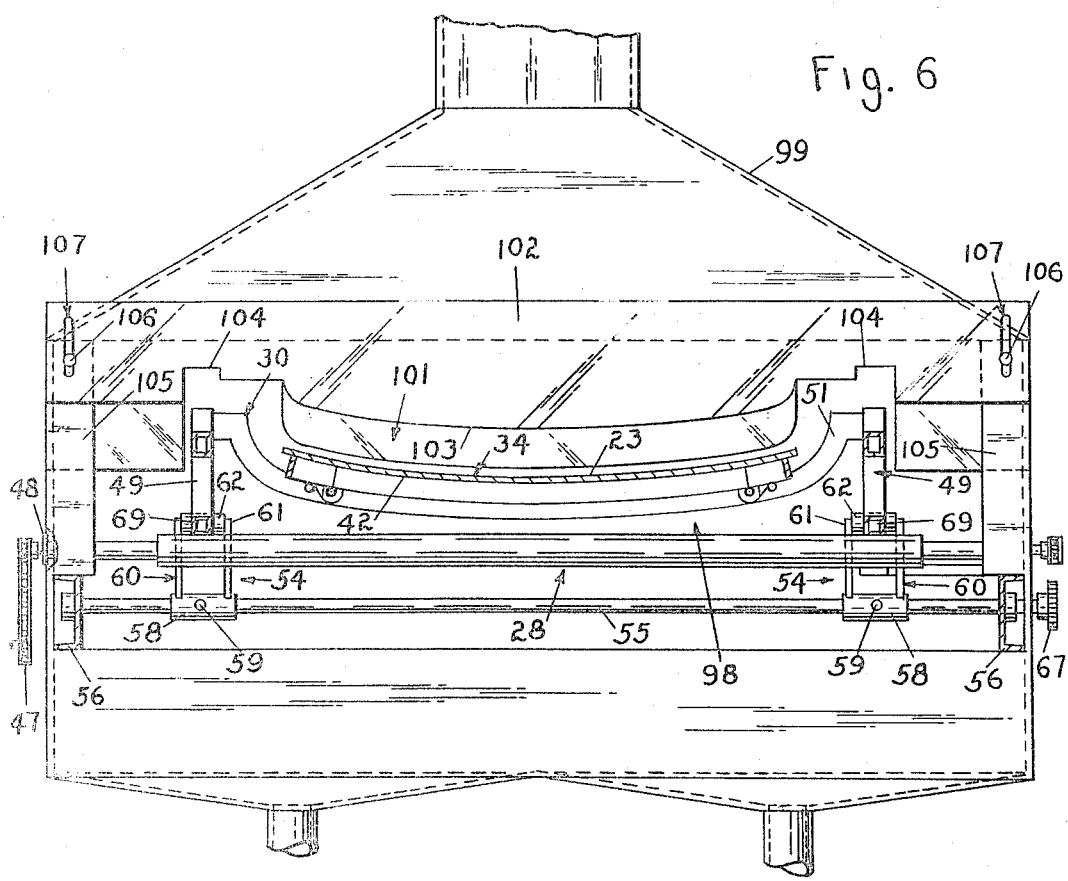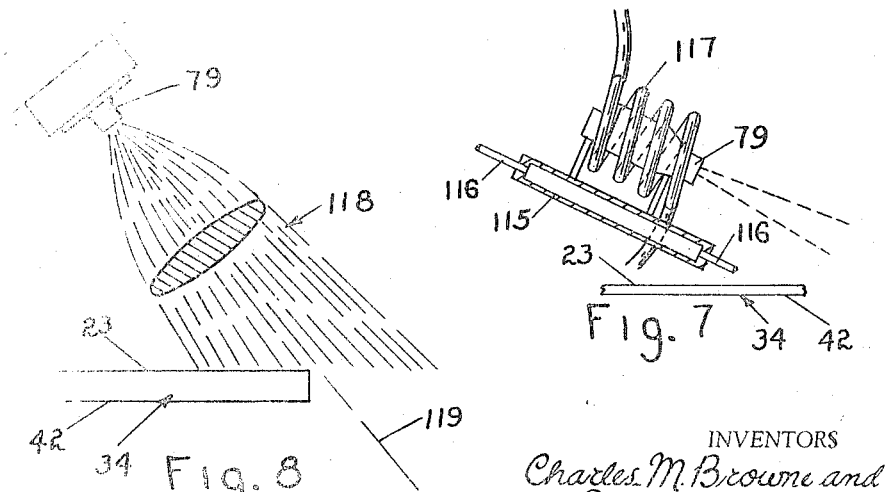

Feb. 21, 1967  C. M. BROWNE ET AL  3,305,336
METHOD AND APPARATUS FOR FORMING A FILM ON A GLASS SURFACE
Filed Oct. 5, 1964  8 Sheets-Sheet 5
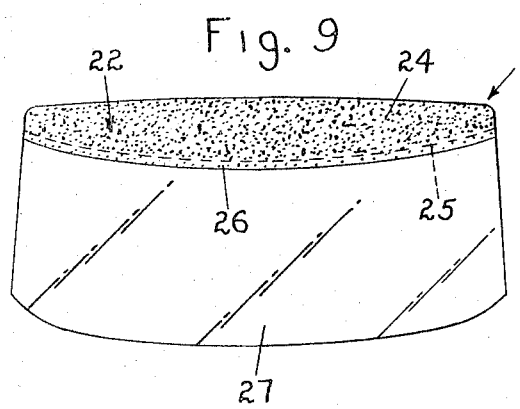
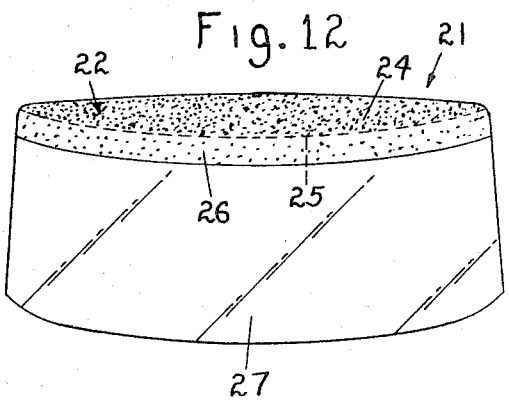
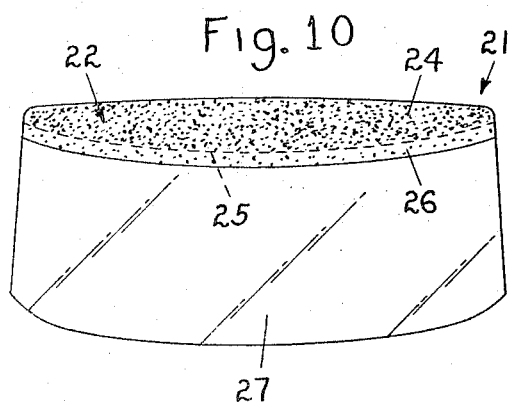
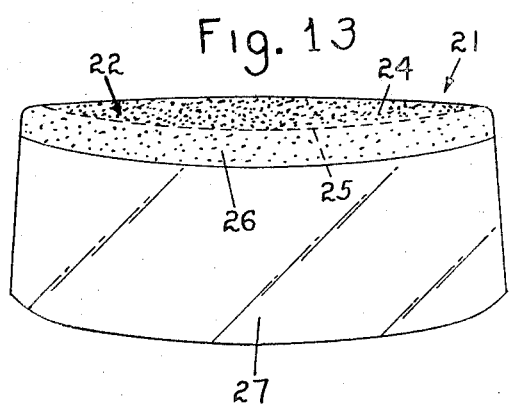
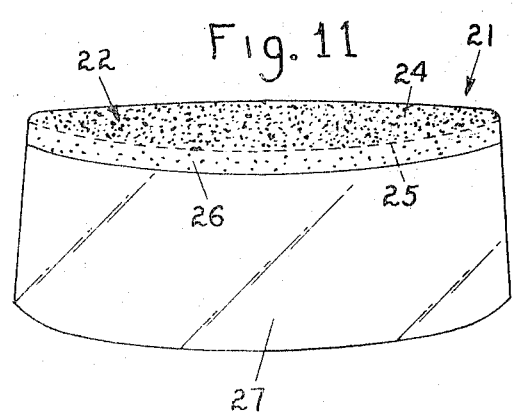
INVENTORS
Charles M. Browne and
BY Robert R. Beckham
Nobbe & Swope
ATTORNEYS Feb. 21, 1967    C. M. BROWNE ET AL    3,305,336
METHOD AND APPARATUS FOR FORMING A FILM ON A GLASS SURFACE
Filed Oct. 5, 1964    8 Sheets-Sheet 6

INVENTORS
Charles M. Browne and
BY Robert R. Beckham
Hobbs & Swope
ATTORNEYS

Feb. 21, 1967   C. M. BROWNE ET AL   3,305,336
METHOD AND APPARATUS FOR FORMING A FILM ON A GLASS SURFACE
Filed Oct. 5, 1964   8 Sheets-Sheet 7

INVENTORS
Charles M. Browne and
BY Robert R. Beckham
Nobbe & Swope
ATTORNEYS

Feb. 21, 1967 C. M. BROWNE ET AL 3,305,336
METHOD AND APPARATUS FOR FORMING A FILM ON A GLASS SURFACE
Filed Oct. 5, 1964 8 Sheets-Sheet 8

INVENTORS
Charles M. Browne and
BY Robert R. Beckham
Nobbe & Swope
ATTORNEYS

United States Patent Office 3,305,336
Patented Feb. 21, 1967

3,305,336
METHOD AND APPARATUS FOR FORMING
A FILM ON A GLASS SURFACE
Charles M. Browne and Robert R. Beckham, Toledo,
Ohio, assignors to Libbey-Owens-Ford Glass Company,
Toledo, Ohio, a corporation of Ohio
Filed Oct. 5, 1964, Ser. No. 405,003
9 Claims. (Cl. 65—60)

This application is a continuation-in-part of our copending application Serial No. 808,460 filed April 23, 1959, and now abandoned.

This invention relates broadly to a method and apparatus for forming films and is more particularly directed to a method and apparatus for spraying a liquid solution onto a plate of glass to be used as an automobile window to provide thereon a filmed band of low visible light transmittance and high solar reflectance.

It has been known to provide an anti-glare screen in an automobile windshield where elimination or reduction of glare from the sun and sky or from objectionably bright artifical light, is desirable. This has been accomplished commercially by providing a general glare eliminating or glare reducing portion in the plastic interlayer of the laminated windshield as described in U.S. Patent No. 2,609,269 issued September 2, 1952, to J. D. Ryan.

However, with the advent of present car designs, the glass area of the back window has increased so that its upper margin now extends over the rear seat and replaces a portion of the conventional car roof. This greater glass area, however, can in some cases bring discomfort particularly for back seat passengers due to increased solar radiation influx into the passenger compartment. Such discomfort is substantially reduced, if not entirely eliminated, by the filming technique of this invention. In addition to applying a satisfactory glare and radiated heat reducing film, the invention also contemplates applying the film in a manner to provide a rear window which will transmit an adequate amount of light, will not unnecessarily darken or objectionably interfere with the view of occupants of the rear seat, or impair the driver's safe view through his rear view mirror and back window of the road to the rear of the car. In other words, the invention may be employed to provide a back window for an automobile that will incorporate the desirable features of low visible light transmittance and high solar radiation reflectance without impairing the necessary light transmittance required for safety and utility.

Therefore, the invention will be described with particular regard to the filming of the rear window of an automobile by using a solution of a metallic salt or preferably of a metalo-organic compound which when sprayed onto a heated refractory base will form a film. However, it is to be understood that it is equally adaptable for filming glass sheets or glazing units in general and this includes more specifically the windshield or any other car window. It is also noted that the method and apparatus of the present invention may be used to film other special types of glass, for example, a prior filmed glass sheet or heat-absorbing glass.

It is therefore a primary object of the present invention to provide a novel method and apparatus for producing a window of an automobile having an integral glare reducing portion to achieve the lowest possible visible light transmittance and the highest possible solar radiation reflectance within the limits of safety and utility.

Another object of the present invention is to provide a window for an automobile having an area of reduced light transmittance and increased solar radiation reflectance integrally formed on a single surface of the window.

It is yet another object of the present invention to provide an apparatus for spraying a film of low light transmittance, and high solar radiation reflectance immediately after bending and tempering of a glass sheet to take advantage of the residual heat remaining in the glass.

Another object is to provide a window for an automobile having a filmed area of low light transmittance and high solar reflectance formed on at least one surface of the window wherein the lower portion of the filmed area is vignetted; that is, in which the color or neutral shade has a minimum transmittance in the area where the greatest protection is desired but tapers off gradually or incrementally to a maximum transmittance or to no shade or color at all, as it approaches the clear glass area of the unit.

It is yet a further object of the present invention to provide a method and apparatus for spraying automobile windows at a time during their manufacture when subsequent film crazing conditions will not be encountered.

Other objects and advantages of the invention will become more apparent during the course of the following description when taken in connection with the accompanying drawings.

In the drawings wherein like numerals are employed to designate like parts throughout the same:

FIG. 1 is a fragmentary perspective view of an automobile having a rear window produced in accordance with the invention;

FIG. 2 is a plan view showing the bending and tempering furnace and the filming station where the windows are sprayed in accordance with the invention;

FIG. 3 is a side elevation partly in section of the bending and tempering furnace and spraying station shown in FIG. 2;

FIG. 4 is an enlarged side elevational view of a portion of FIG. 3 showing the tempering furnace and spraying station;

FIG. 5 is a sectional view taken along line 5—5 of FIG. 4 looking in the direction of the arrows;

FIG. 6 is a sectional view taken along line 6—6 of FIG. 4 looking in the direction of the arrows;

FIG. 7 is an enlarged side elevational view partly in section of the spray guns shown in FIG. 5 modified for cooling;

FIG. 8 is a side elevation view of a spray gun diagrammatically showing the spray pattern emitted by the gun nozzle;

FIGS. 9 through 13 are elevations of rear windows for automobiles filmed in accordance with the present invention;

Figure 15:
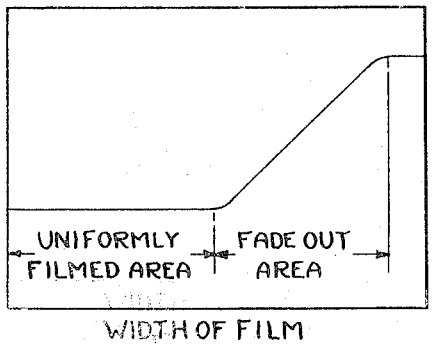
FIGS. 14 through 16 are graphic representations of the light transmitting properties of a glass sheet filmed in accordance with the present invention illustrating the relationship between the percentage of light transmittance and the width of the film across the surface of the glass sheet.

Referring to FIG. 1, there is shown an automobile 20 wherein the rear window 21 has been treated according to the present invention to form a film or band 22 of controlled light transmittance and solar radiation reflectance on the interior surface 23 (FIG. 5). This filmed band has the lowest light transmittance in its major filmed area, to be later defined, and highest solar radiation reflectance in this major area, with respect to the interior of the automobile, that is possible for a functional rear window. More specifically this band 22 has a major or first area 24 where the transmittance is restricted to the greatest extent, bordered by a fade-out line 25 that defines, within band 22, a second or fade-out area 26 in which the transmittance of the film gradually and progressively increases until its value reaches the clarity of the glass in the unfilmed or third area 27. This graduated fade-out through area 26 will be discussed further and in greater detail with reference to the drawings as the specification proceeds.

Referring to FIG. 2 there is shown a conventional bending and tempering furnace through which the glass to be filmed passes. As the glass is carried through the bending furnace it is heated and sags into conformity with the shape of a bending mold upon which it is supported. On emerging from the bending furnace the sheet passes through a tempering station and then through a filming station where the film of the present invention is applied.

Turning now to FIG. 2 and to a description of the invention in detail there is shown a continuous closed path conveyor 28 of conventional design which is composed generally of a series of power driven horizontally disposed spaced rollers 29 some of which are grouped in independent sections. The conveyor 28 is adapted to convey bending molds 30 through a bending furnace 31 and a tempering station 32 and to continuously recycle the molds. It is noted at this time that immediately following the tempering station 32 is a spraying apparatus or station 33 wherein, in accordance with the present invention, the bent and formed glass sheets 34, resting in a mold 30 moving in the direction of arrow 35 are sprayed.

Referring now to FIG. 3 and 4, the portion of conveyor 28 passing through the bending furnace 31 includes a power driven roller conveyor section 36 extending the length of the furnace 31. The molds 30 carry the glass sheet 34 along this conveyor section 36 through the furnace 31 where the glass is heated above bending temperature by suitable means (not shown) and to the exit end 37 of the furnace 31. The glass sheet 34 on arriving at this point has sagged to shape itself as determined by the molds 30. At the discharge end 37 of furnace 31, the molds pass onto a speed-up conveyor section 38, also forming part of the general conveyor path 28, upon which they pass through the tempering or quenching station 32. This quenching station 32 includes a pair of manifolds 39, into which cooling air, forced by suitable fans in the direction of arrows 40, is passed through a series of nozzles 41 to cool the glass. Only that portion of the bending and tempering process has been shown and described which is believed necessary for an understanding of the invention; however, if desired, reference may be had to U.S. Patent No. 2,646,647 issued July 28, 1953, to W. P. Bamford et al. for a more particular and detailed explanation of the aforementioned bending and tempering apparatus.

Mold 30, having passed through the furnace 31 and quenching chamber 32, is carried along speed-up conveyor 38 into spray position. Since the glass is being quenched or cooled by forcing air over the glass sheet surfaces 23 and 42, these surfaces are cooler than the interior of the glass sheet. Thus, as the glass sheet 34 issues from the quenching station the surface temperature may for example be between 700° and 750° F. However, a few seconds later the surface temperature will rise to approximately 780° F. due to the fact that the interior portion of the glass acts as a reservoir of heat. Consequently, as the filming solution is sprayed onto the glass sheet surface 23, heat flows from the interior supplying the necessary energy for the filming reaction.

By mounting the spray station 33 is close as practicable to the exit end 43 of tempering chamber 32 this residual heat remaining in the glass sheet is utilized to produce a film from the filming solution when it contacts the hot glass surface 23.

As the mold 30 is carried along the extended portion 44 of the conveyor section 38 this portion 44 extending slightly beyond the exit end 43 of tempering chamber 32, it passes onto an independent conveyor section 45 which operates in conjunction with the spray means 33. This conveyor section 45 is also composed of a plurality of spaced independent cylindrical rolls 46, and driven by suitable drive means (not shown) through the medium of a belt or chain 47 (FIG. 4), however, a friction slip clutch 48 (FIG. 5) is provided for each of the rolls 46 for a purpose to be later described, to control the driving action of the chain 47 on the rollers of conveyor section 45.

In order that later discussion of the operation of the spray means 33 might be clear it is felt desirable to insert here a brief discussion of the structure of the molds 30. Each mold 30 generally includes a pair of leg members 49, one leg on each side of the mold, the lower extremities 50 of which rest upon the rollers which comprise the conveyor system 28. As the mold moves along the conveyor path, the extremities of legs 50 as seen in FIGS. 4, 5 and 6 rest upon the conveyor rollers and each mold 30 is moved along a lateral course in the direction of arrows 35 by the driven rollers. These downwardly extending legs 49 support the main body 51 of the mold 30 which in turn supports the means for shaping the glass sheet 34.

As the mold 30 continues on its path, one of the mold legs 49 will strike a timer switch 52 (FIG. 4) and depress this switch 52 to activate a timer 53 (FIG. 4). As seen in FIG. 4, switch 52 is located just in advance of a mold stop 54. When the mold 30 strikes this mold stop 54 it comes to a rest position where it is stationary and in position for the subsequent spraying operation by the spray means generally indicated at 33 (FIG. 2). In the embodiment shown there have been provided two mold stops 54 (FIG. 6), one on each side of the conveyor path, and each substantially in longitudinal alignment with one of the dependent legs 49 of the mold 30. These stops are positioned to positively arrest the forward movement of the mold by contacting each depending leg 49 of the mold 30. Each stop 54 is itself fixedly mounted to a shaft 55 that extends across the full width of the apparatus and which is suitably journaled for free rotation in, for example, I-beams 56 that form a portion of the conventional framework 57 housing the apparatus. Each stop 54 includes a sleeve portion 58 (FIGS. 4 and 6) in surrounding relationship to the shaft 55 and fixedly mounted to the shaft 55 by means of set screw 59. Each of the stops 54 also includes two parallel spaced rods 60, upwardly extending towards the mold, the upper ends 61 of which project slightly above the plane determined by the uppermost peripheral surfaces of the conveyor rollers. Mounted between extremities 61 of these rods 60, on each stop 54, is a roller 62 covered by a suitable heat resistant material. This bar or roller 62 is actually the portion of the stop 54 which comes into physical contact with the advancing mold 30 to arrest its movement.

The stops 54 are normally held in a heavy line position, shown in FIG. 4, by means of a releasable locking device 63. This releasable locking device 63 includes an air cylinder 64 the activating plunger 65 of which is fixedly connected to a chain 66. Fixedly mounted to shaft 55, upon which are located stops 54, is a sprocket gear 67 (FIG. 6) over which this chain 66 passes. The chain 66 itself has fastened to its depending end, a counter weight 68 and the teeth of the sprocket gear 67 are in engagement with the links of chain 66. It is therefore seen that when the air cylinder 64 is activated, so that the plunger 65 is withdrawn, the chain 66 is held taut by weight 68, and is maintained in substantially the solid line position seen in FIG. 4 so that each stop 54 is held in a vertical position and in the path of a mold. However, as will later be described, when the air cylinder 64 is released upon activation of the timer 53 the weight 68 pulls on chain 66 causing each stop 54 to pivot or rotate in a clockwise position, i.e., to the dash line position of FIG. 4 where the stop 54 is below the level of the conveyor path, so that the molds 30 will again be free to travel along the path of the conveyor 28.

When the switch 52 has been depressed by a mold leg 49, held depressed by a side bar 69 of the mold, and the mold is held stationary by stops 54, the timer 53 which was activated by the switch 52 causes operation of the spray means 33. This spray means 33 deposits the film solution on the glass sheet 34, held in a mold 30, while the mold is in its stationary position. Since the mold held by stops 54 is unable to travel, slip clutches 48 operate so that the conveyor rollers 46 are no longer driven but idle so as not to cause any relative movement of a mold resting thereon.

Turning now to the actual spray device by means of which the film solution is deposited upon the glass in the mold, there is suspended from a pair of I-beams 70 (FIGS. 4 and 5) a transversely extending beam 71, all the beam members being joined or otherwise welded together and beams 70 themselves constituting a portion of the general framework 57 of the apparatus. By means of coil bands 72 a pair of downwardly extending supporting tubes 73 (FIGS. 4 and 5) are fixedly positioned. These tubes serve to support the movable carriage 74 (FIG. 4) and also the platform 75 supporting the drive mechanism indicated generally at 76, this latter platform 75 being fixedly mounted between the tubes 73 by other coil straps 77.

The movable carriage 74 has a spray dispersing means 78 which, in the embodiment shown, includes a pair of spray nozzles 79 (FIGS. 5 and 19) as well as the necessary hose connections (not shown) by means of which the fluid or filming solution is supplied to these nozzles under suitable pressure so as to atomize the filmed solution into a spray. These nozzles 79 are mounted at the lowermost end 80 of the movable carriage 74, while the upper end 81 of the carriage 74 is carried by pairs of suitable rollers 82 (FIGS. 4 and 20) engaging contoured cam bars or tracks 83a and 83b supported fixedly by the tubes 73. When the movable carriage 74 is caused to move back and forth transversely across the apparatus, these rollers 82 follow the contour of the cam bars 83a and 83b which, in a manner to be hereinafter described, are shaped so as to cause the carriage to be raised and lowered while at the same time causing the spray nozzles 79 to be angularly swung at each end of their path of travel.

Figure 17:
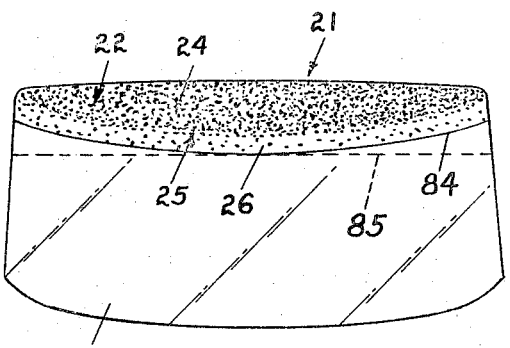
FIG. 17 is an elevation of a rear window of an automobile filmed in accordance with the present invention.

Another important feature of the present invention is the control of the locus of the lower edge or eye line of the graded film band. The eye line should be, after installation (FIG. 18), substantially horizontal. To accomplish this the eye line 84 must be initially bowed as seen in FIG. 17. If the eye line were straight (dotted line 85, FIG. 17) the eye line would then appear, when the window was installed (FIG. 18), as dotted at 86.

One manner of achieving this control of the eye line would be by adjustment of the vertical motion of the nozzles. The spray nozzles 79 move up and down and along in a predetermined path so that the spray from the guns will always be directed towards the plane of the glass sheet 34 from substantially the same height. By means of the contour cam bars 83a and 83b, the nozzles 79 are, at the same time, maintained in parallel relationship to the plane of the glass sheet and particularly with respect to the end areas thereof. Thus, nozzles 79 move from the solid line position (FIGS. 5 and 20) to the dotted line position (FIGS. 5 and 20) and in both positions the distance between the nozzle 79 and surface 23 of sheet 34 remains substantially constant. This is desirable to achieve proper vignetting in the fade-out area 26 of the film (FIG. 1) and also proper uniformity of the film spray all across the sheet being sprayed.

In other words, the nozzles follow a path, determined by the contour bars, which is similar to the actual contour of the glass sheet being sprayed. Therefore, a flat glass sheet or contoured glass sheet of any shape, be it a "cap" or "panoramic" windshield or a "cap" back window, may be sprayed irrespective of its contour. However, under certain conditions, to maintain the eye line horizontal after installation, it has been found that the nozzle to glass distance in proximity to the opposite ends of the window (i.e., where the glass is raised or bowed upwardly) should be varied. Generally speaking, in these areas the nozzle to glass distance is increased.

Figure 19:
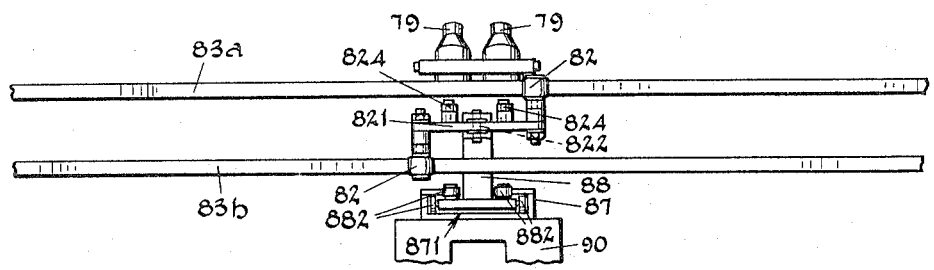
FIG. 19 is a plan view showing the contour bars carrying the spray apparatus of the invention.
Figure 20:
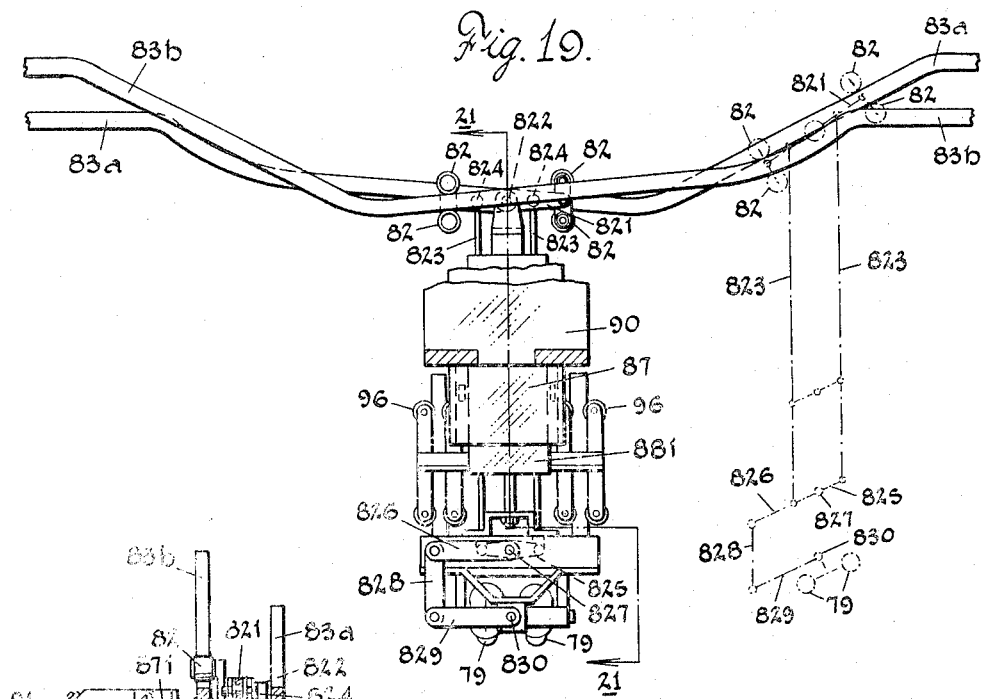
FIG. 20 is an enlarged elevational view, partially in section, showing a portion of the spray apparatus as viewed from the rear in FIG. 5.
Figure 21:
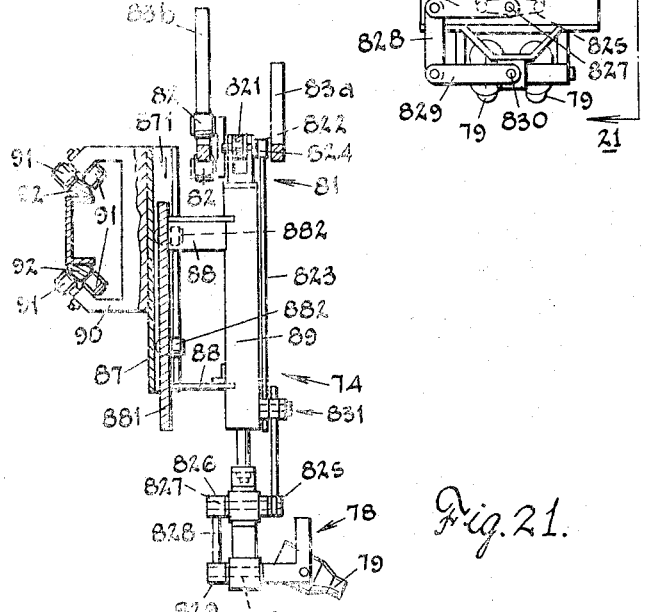
FIG. 21 is a sectional view taken along line 21—21 of FIG. 20, looking in the direction of the arrows.

There is shown generally in FIGS. 4 and 5, and in detail in FIGS. 19 to 21, the apparatus by which proper transverse movement is imparted to the carriage 74 and the spray nozzles 79 carried thereby. Thus, the upper end of an arm 87 having a slideway 871 formed therein is connected by means of arms 90 to rollers 91 which rest upon transverse bars or rails 92 on platform 75. Connected to a portion 89 of the suspended frame of the carriage 74 by link arms 88 is a guide plate 881. The guide plate 881 is received within the slideway 871 of the arm 87. Rollers 882 carried by the guide plate 881 allow the guide plate to move freely and in a linear direction within the slideway in a manner to be hereinafter more fully described. Thus, it will be seen that the upper end 81 of the carriage 74 is freely suspended from the contour bars 83a and 83b to move laterally therealong, while at the same time moving vertically with respect to the arm 87 which is carried by the transverse rails or bars 92.

The reversible drive means 76 are provided with an electric brake, to insure instantaneous cessation of all motion at the required time and position, and drive means 76 are mounted upon or to platform 75 upon which is located the transverse bars or rails 92. Through sprocket 93, belt 94 and sprocket 95 the drive of this mechanism 76 is transferred to arms 90 to cause the arms 90 to move back and forth so that the traversing motion is conveyed to the carriage 74.

As best seen in FIGS. 19 and 20, the pairs of rollers 82 adapted to traverse contour bars 83a and 83b are connected by a walking beam 821 from which the carriage 74 is pivotally suspended at 822. The upper ends of operating rods 823 are pivotally secured to the walking beam at 824 and, at their lower ends, the operating rods are pivotally connected to a second walking beam 825. A lever 826 is affixed to one end of a shaft 827, the other end of which is affixed to the second walking beam, so that pivotal movement of the second walking beam about the shaft 827 is imparted to the lever 826. The lever 826 is pivotally connected through a link 828 to an operating arm 829. The operating arm is, in turn, affixed to one end of a rotatably mounted shaft 830 which carries the spray nozzles 79 at its other end.

In order to raise the spray dispersing means 78 upwardly out of operating position so as to permit access to the apparatus therebeneath, there is provided an air cylinder (not shown) connecting the upper and lower sections of the carriage 74. Freely rotatable rollers 96 guide the up and down movement of the lower section of the carriage 74 with respect to the upper section thereof in response to activation of the air cylinder. The operating rods 823 are jointed at 831 in any suitable manner (FIG. 21) to permit this raising of the spray dispersing means 78 out of operative position. During actual operation of the spray apparatus, that is, while the carriage 74 is traversing the contour bars 83a and 83b, the air cylinder maintains the spray dispersing means 78 in its lowered, or operative, position.

Briefly reviewing the operation of the spray carriage, as the carriage moves from its intermediate position to one extremity of its traversing motion as shown in FIG. 20, the pairs of rollers 82 follow their respective contour bars 83a and 83b. Consequently, the center of the walking beam 821, from which the carriage 74 is suspended, is elevated, thereby causing the carriage to be elevated. At the same time, the walking beam moves from a horizontal position to an inclined position, thereby causing the operating rod 823 to be raised with respect to the point 822 from which the carriage is suspended and the other to be lowered. The second walking beam 825 and the lever 826 are caused to pivot about shaft 827 by this movement of the operating rods. The lever 826, through link 828, causes the operating arm 829 to pivot the nozzles 79 on the shaft 830. It will thus be apparent that the elevation of the carriage will be determined by the average elevation of the contour bars at the points where the pairs of rollers are positioned at any particular time, while the angular position of the nozzles will be determined by the difference in elevation of those points. Therefore, by proper selection of contour bars 83a and 83b, the spray nozzles can be caused to follow the contour of any glass sheet. It is believed obvious that where the glass sheet to be sprayed is symmetrical, the contour bars 83a and 83b will be identical but reversed.

When the guns move back and forth transversely of the sheet in order to achieve the desired spray pattern so as to effect characteristics, to be later discussed, of graduated visible light transmittance and also to restrict the pattern to the proper area, some type of screening or masking of the surface 23 of sheet 34 being sprayed is desired. This is because it is desirable to have the portion of the film band characterized by uniform light transmittance as wide as possible as illustrated by curve 97 of FIG. 16. This will make maximum use of the radiation rejecting features of the film. It is noted that the maximum reflectance of solar energy occurs when the film is uniformly dense and near the point of minimum light transmittance without iridescence.

As seen in FIG. 4 when the mold 30 has been stopped, its lead end projects slightly into an exhaust chamber 98 formed by duct work 99. Therefore, as the spray stream 100 is directed toward the exhaust chamber 98, it flows along the dotted lines as seen in FIG. 4. Referring now to FIG. 6, an opening 101 to the exhaust chamber 98 is contoured by a plate 102 and the lower end 103 of this plate has the same general configuration as does the glass sheet 34 resting in mold 30. The other sections, i.e., the ends 104 of the plate 102 are also contoured in the embodiment shown to match that, generally speaking, of the mold itself. The plate 102 is fastened to the duct work wall 105 by means of suitable fasteners 106. A key slot 107 is provided in the plate 102 so that the plate may be raised and lowered to control the opening of space 101 between the glass sheet 34 and the lower edge 103 of the plate 102. Referring now to FIG. 3, an exhaust fan 108 is positioned at the top of the duct work 99 to create a draft in the direction of arrow 109. This causes a flow of air across the surface 23 of sheet 34 to insure that the spray 100 when directed by nozzles 79 will not cover any portion of the sheet other than the advanced area of the sheet adjacent the lead edge 110 of sheet 34 upon which the film is to be deposited. This overcomes the problem of the back draft and by adjusting the suction on the fan 108 and the size of the opening 101, the amount of the draft may be effectively controlled so that it will not become so excessive so as to pull the spray over and off the glass being sprayed. Generally speaking, an air velocity of about 500'/min. across the glass is preferable.

Figure 14:
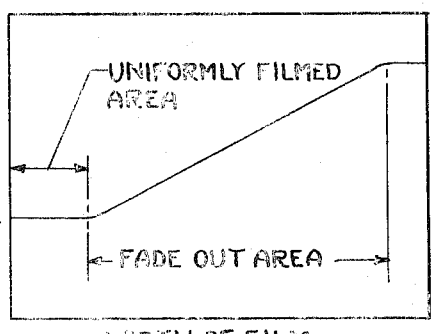
Figure 16:
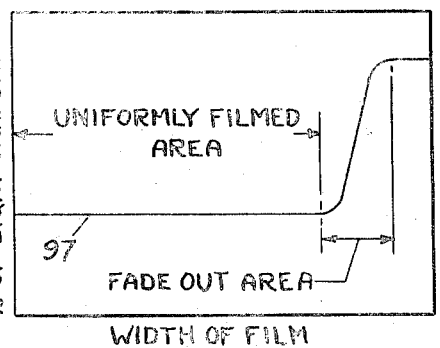

FIGS. 14 to 16 illustrate this air flow across the surface of the sprayed surface as it affects the proper gradation of the film. As seen in FIG. 14, when the velocity is too low, the fade-out area of the filmed band is too wide. The increase of light transmittance is very gradual and results in a filmed sheet that has no easily defined area of light control. As seen in FIG. 15, if the air velocity is slightly increased, the fade-out area is still too wide. The film is dispersed and relatively ineffectual to control light transmittance. It should be understood, however, that if the air velocity is made excessively large, it would blow the film spray off the sheet.

When, as seen in FIG. 16, there is an optimum air flow, there results (FIG. 17) a filmed window having a proper width of fade-out area 26 and proper width band 24 of uniform light transmittance control across the major portion of the total filmed area. The narrow vignetted film band in the fade-out area 26 is graded and the film in this fade-out area rapidly diminishes until it vanishes at the point of film termination, i.e., the lower edge 84 of the filmed area, the remaining portion 27 of the rear window 21 below area 26 being clear and not filmed.

Figure 22:
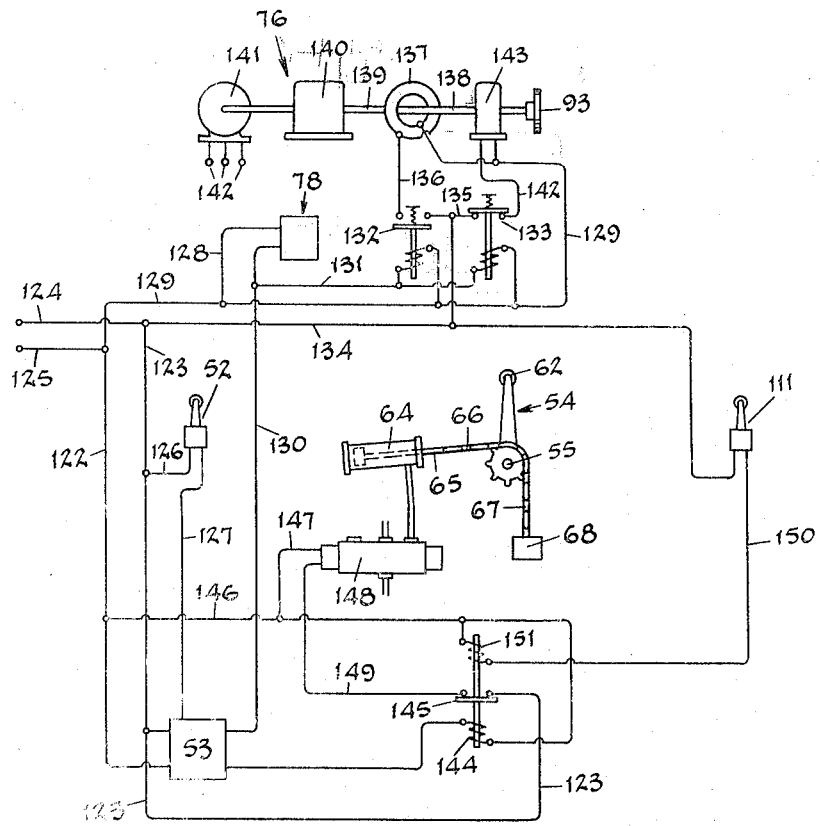
FIG. 22 is a schematic diagram of a system for controlling the sequence of operations of the invention.

There is shown in FIG. 22 suitable mechanism for controlling the operation of the apparatus. Thus, as a mold 30 carrying thereon a bent sheet 34 to be filmed approaches the spray means 33, the leg 49 of the mold depresses the switch 52 which is held depressed by the side bar 69 as the mold continues to advance. The timer 53 is connected by lines 122 and 123 to the lines 124 and 125 of an electrical power supply, and lines 126 and 127 connect the switch 52 to line 123 and the timer 53, respectively. As the switch is depressed by the mold, a circuit is completed through the timer which, after a predetermined delay to allow the mold to come to rest against the rollers 62 of the mold stops 54, initiates the spraying cycle.

The spray means 78 is connected through lines 128 and 129 to the line 125 of the power supply. After the mold has come to rest in its assigned position, the timer completes a circuit through a line 130 to the spray means, causing spraying of the film forming compound through the nozzles 79. Simultaneously, the signal to the spray means is transmitted through a line 131 to close a relay 132 and open a relay 133. As the relay 132 is closed, a circuit is completed through a line 134 connected to the line 124 of the power source, a line 135, relay 132, a line 136, an electric clutch 137 and line 129 to the other line 125 of the power source. The electric clutch thus causes the shaft 138 upon which the sprocket 93 is mounted to be engaged by a shaft 139 of a self-reversing drive 140 which is, in turn driven by a motor 141. The motor is independently connected to a power source at 142.

When the relay 133 is opened, a circuit through the lines 124, 134 and 135, relay 133, a line 142, a magnetic brake 143 and line 129 back to line 125 of the power source is interrupted. Thus, the magnetic brake is released, allowing the shaft 138 and sprocket 93 thereon to be rotated with the shaft 139 of the reversing drive 140. The sprocket 93 drives the chain 94 so as to cause the carriage 74 to move back and forth in its traversing motion, thereby spraying a band of the film forming compound across the sheet.

When the carriage has made the prescribed number of passes across the sheet, the timer 53 opens the relay 132, closes the relay 133 and discontinues operation of the spray means 78. Thereupon, the electric clutch 137 disengages the shaft 138 from the shaft 139 of the reversing drive 140 and motor 141, and the magnetic brake 143 causes the shaft 138 and carriage 74 driven thereby to immediately stop. Simultaneously, the timer causes a solenoid 144 to open a relay 145 and interrupt a circuit from line 125 of the power supply, through line 122, lines 146 and 147, a compressed air source 148, a line 149, the relay 144 and line 123 to the other line 124 of the power source. As the circuit is interrupted, the compressed air is released from the cylinder 64, thereby allowing the plunger 65 to be extended therefrom by the counterweight 68 attached to the chain 66. The chain rotates the sprocket gear 67 over which it passes, causing the shaft 55 to rotate the mold stops 54 to the broken line position of FIG. 4. The friction clutches 48 are also engaged so that the rollers 46 are again able to drive the mold 30 along the conveyor 28.

The advancing mold then strikes a second switch 111, completing a circuit from line 124 of the power supply, through line 134, the switch 111, a line 150, a solenoid 151, the lines 146 and 122 to the other line 125 of the power source. The solenoid 150 closes the relay 145, energizing the compressed air source 148 and retracting the plunger 65 to raise the stops 54 into the solid line position of FIG. 4, where they will arrest or stop the next succeeding mold and retain it in spraying position. The apparatus is then ready to repeat the spraying cycle. After passing switch 111, the mold 30 is free to move along and around the end 112 of the conveyor 28 as seen in FIG. 2 and back along the portion 113 of the conveyor 28 where the glass sheet now filmed cools down to handling temperatures so that the sheet can be removed from the mold. The mold 30 continues its path and is returned to the position indicated at 114 where it will again be ready to receive another glass sheet to carry it through a continual cycling of the above described process.

Thus it is seen, there has been provided a continual process whereby a sheet of glass 34 is carried through a furnace 31, bent to a desired shape, passed through a quenching station 32 where it will be set in that shape, under a spray means 33 which deposits the desired film upon a selected area of the sheet in a desired pattern, and through a cooling zone.

As hereinbefore discussed, the general object of the invention is to produce a functional back window of an automobile with a filmed area, above the eye line 84 (FIG. 18), having the lowest possible visible light transmittance and the highest possible solar reflectance, coexistent with utility, and which film is vignetted adjacent its lower edge. It is noted that when the glass is filmed below a certain visible light transmittance, an iridescence or oil slick reflection of different colors appears upon the back light so it is therefore proposed, as above discussed, to control the filming to achieve the lowest light transmittance in the visible that will not show iridescence. Examples of suitable filming materials are water or alcohol solutions of cobalt acetates, nitrates or perchlorates, into which a quantity of nickel acetate is incorporated. A suitable solution may be prepared by dissolving 50 grams of cobalt acetate, $Co(CH_3COO)_2 \cdot 4H_2O$, in 50 milliliters of water, and adding this to a solution of one gram of nickel acetate, $Ni(CH_3COO)_2 \cdot 4H_2O$, in 5 milliliters of water. Numerous other suitable film forming materials and solutions will be apparent to those skilled in the art.

In this regard, a number of factors have been found to affect the resultant film, for example, the temperature of the glass during the spraying operation is most important. It has been found that the higher the temperature when the film is applied, within reasonable operating limits found to be normally between about 700° F. and 960° F., the lower the daylight transmittance factor without producing iridescence. It should be understood, however, that filming can be accomplished under certain circumstances at higher temperatures if desired. By making proper use and control of the residual heat remaining in the bent glass sheet after bending and tempering, it has been found that satisfactory spraying may be accomplished in approximately 8–10 seconds by using between 6 and 8 passes of the spray applicators. The spray fluid delivery rate per nozzle is preferably, under these circumstances, between 300 and 450 cc. per minute and the pressure required for this fluid delivery will be dependent on the type spray nozzle used and other hydraulic parameters of the system. Ten p.s.i. is a satisfactory pressure. It should be remembered also that this procedure will not interfere with the normal productive rate of the bending furnace.

The film actually unites with the surface of the glass sheet and to some extent cools the glass, which cooling affects film formation. Since good films having a high abrasion resistance must be built up slowly, layer-by-layer (pass-by-pass), a certain length of time is necessary for film formation or to cause oxidation and deposition of the film on the glass. The filming compounds, impinging on the hot glass, require time to undergo the successive chemical steps leading to the film which is the last step in the process and the estimated time for the complete film forming process is between 0.01 to 0.5 second. During the initial steps, thermal decomposition occurs with evolution of gaseous products. The gases must escape without entrapment by the subsequent deposition of filming compounds in a second layer (pass). Gas entrapment in the film leads to haze and a film with low abrasion resistance. However, it has been found that in the present method, before the temperature of the glass falls below 600° F. and preferably while the glass is substantially at about 775° F. for best results, the film as deposited by the 6 to 8 passes has formed completely. This is an essential feature because if filming is not completed, in other words, if the total number of passes by the spray nozzles is not accomplished while the temperature of the glass is still above the critical temperature, the film may be contaminated with powder rather than depositing as a true film. The glass as before noted will be cooled somewhat as the film is deposited on it, therefore, it is essential that by the time the last pass of the spray nozzles occurs, the glass still be at a temperature above that at which the film will powder. This may be accomplished in many ways, for example, by properly controlling the heat in the bending furnace, the amount of suction draft, the atomizing pressure, the composition of the spray solution, by taking advantage of the residual heat in the glass and by a proper time or length of spray application. Satisfactory filmed glass sheets and automobile rear windows have been produced within the desired transmittance and radiation limits and without iridescence following the aforedescribed procedure.

The atomization of the spray itself might be accomplished by any suitable means such as steam, inert gas, or air and will produce a satisfactory film. However, when certain labile spray solutions are used, which quickly precipitate, it may be desirable to provide some type of refrigeration for the spray solution and also to continually circulate the solution. In this case, as seen in FIG. 7 a shield 115 water cooled or air cooled through conduit 116, can be positioned between the nozzle 79 and the surface 23 of the glass sheet 34 therebelow being sprayed. Other coils 117 can be wrapped around this nozzle and connected to the cooling shield 115 to control the stability of the solution and prevent precipitation However, some solutions have been found to be sufficiently stable and also to be unaffected by the heat of the glass so that the cooling is therefore not in all cases necessary. It is, however, pointed out that degree of light transmittance in the film particularly when using a water base solution is believed slightly lower without iridescence when the glass temperature during filming is maintained at the upper limit of the effective range as hereinbefore set forth.

The exhaust vapors, hereinbefore discussed, cause an air current across the sheet in the direction of sheet travel to eliminate any back spray and constitute one form of the screening or masking herein discussed. However, any suitable masking material and/or conventional screening or masking means may be used in its place, the problem being only to control the spray in such a manner that it will not cause undesirable spotting of the unsprayed portion of the back window. In this connection the general spraying technique, in the present embodiment shown, includes two horizontally disposed nozzles, however, either 1, 2, 3 or any other number of nozzles arranged in a suitable pattern may be used. It might also be pointed out that the spray guns emit overlapping spray cones having an angular coverage of approximately 45°. The nozzles are themselves slightly at an angle with respect to the horizontal of the glass, this angle being in the neighborhood of about 25° from the horizontal. However, the angular relationship of the nozzles to the glass, the angular coverage of the spray cone and the number of nozzles establishing the pattern can be altered as desired and such alterations are considered to be within the spirit of this invention. It has further been found to be generally desirable that the center line of the spray cone be slightly in advance of the sheet being sprayed so that the spray is directed not only angularly with respect to the sheet and in a direction towards the edge to be sprayed, but also slightly in advance of that edge. The spraying herein discussed has been found not to inhibit in any way the performance of the molds nor does it cause any undesirable toxic problems in the area of the spraying.

The film thickness which is the main factor determining the visible light transmittance of the film is chiefly a function of the fluid delivery rate, concentration of the solution, the spraying time and the efficiency of the process and could be expressed as follows:

$$\frac{\text{rate} \times \text{concentration} \times \text{time} \times \text{efficiency}}{\text{area filmed}} = \text{thickness of film}$$

Manufacturing procedures fix the time available for spraying (8–10 seconds). The concentration of the spray solution is fixed by the solubility of the solute in the solvent, particularly since normally the concentration is made as high as possible consistent with the minimum ambient temperature and these two in combination will fix the fluid delivery rate.

The film thickness, therefore, is directly influenced by the efficiency of the process and while this efficiency is a function of all parameters the most practical considerations determining it are the air flow over the glass and glass surface to spray nozzle distance. Efficiency decreases as the workpiece to gun distance increases and this occurs for several reasons, as for example, the following:

(a) The velocity of the spray droplets decreases and difficulties are encountered in impinging them onto the glass surface being filmed.

(b) The air flow over the glass has a longer time to sweep the spray droplets away from the area being filmed.

(c) The density of droplets decreases with distance from the gun because of the fan effect of the spray pattern.

Another important consideration in the efficiency is how much of the spray fan 118 (FIG. 8) is directed at the glass by the spray gun that is angled with respect to the sheet, and this is controlled by the angle at which the guns are mounted, i.e., the gun angle being the angle between the guns and the surface being filmed. Usually not much more than half of the spray fan 118 is used as seen in FIG. 8. Thus, the apex or center line 119 of the spray determining the gun angle is aimed just slightly in advance of the lead edge 110 of the sheet 34. This figure shows that the fan is elliptical in cross-section. The center portion of the fan, which is fairly uniform in width, plays an important part in the uniform deposition of the film to insure a correctly shaded backlight, and the lower portion of the fan helps to produce the fade-out.

Summing up all the aforediscussed factors, it therefore can be said that the efficiency of the spray system or process in producing the required spray pattern as illustrated in FIGS. 8 and 16, which efficiency is one factor influencing the film thickness, is itself influenced by the flow of air across the sheet, the distance between the spray nozzle and the glass and the angle between the inclined gun and the glass.

It might be additionally pointed out that the filming as shown herein envisions a single operation process with no interruption between the bending and tempering of the sheet and the spraying of the sheet. However, if desired, the glass, after tempering and bending, could be cooled and at some subsequent time reheated to a sufficient temperature which would allow the necessary chemical reaction of the filming solution on the glass surface to produce the film. However, by spraying the glass sheet in a continual process so as to take advantage of the residual heat in the glass to form the film thereon, there is realized a notable savings in labor, money, and materials. Over and above this, during reheating the glass may be broken or rendered less receptive to filming.

Referring now to FIGS. 9 to 13, there is shown a plurality of glass sheets formed into automobile rear windows 21 in which it is noted that a distinct shading or tapering off, i.e. vignetting, of the filming band has been achieved in the lower portion of the band. This tapering off is highly desirable to avoid a sharp break between the filmed area and the nonfilmed area and to give a gradual return to the clear transmittance of ordinary glass from the shaded band area. The primary purpose of the shaded band is to reduce total solar radiation transmittance through the glass and have a relatively high proportion of the radiation reflected. The film does not impair the driver's visual line of sight through the mirror since as seen in FIG. 1 it covers only approximately the top 11 inches of the back window itself in the specific embodiment illustrated. However, generally speaking, the back window is sprayed so that the film will be restricted to that area of the window which is above the driver's line of sight through his rear view mirror.

It is seen that the fade-out area 26 of an automobile back or rear window in which the progressive diminishing of the film occurs can be controlled in width as aforementioned so as to be of any desired size. The actual size is determinable by the desired finished characteristics required because of safety requirements and because of the light transmittance necessary. Referring to FIG. 9 and to illustrate the flexibility of the present invention, it is seen that in this embodiment the vignetted portion 26 covers the last inch of the filmed band while in FIG. 10 the vignetted area 26 covers the last 2 inches, in FIG. 11 the vignetted area 26 covers the last 3 inches, in FIG. 12 the vignetted area 26 cover the last 4 inches and in FIG. 13 the vignetted area 26 covers the last 5 inches. The filmed glass area has a total length of about 11 inches as measured from the roof edge of the window in each of these illustrated embodiments which are included to illustrate but not to restrict the invention.

In FIGS. 9 to 13 this vignetted film is shown as applied to a back window and the film restricted to the area of the window above the driver's vision line through his rear view mirror. However, if desired, the total filmed area could cover the entire surface of the window or any selected portion thereof. In this later case, the light transmittance through the filmed window area coincident with and below the line of vision of the driver would have to be at least 70% for safety and to insure to the driver an unobstructed view of the road to his rear. The film procedures herein disclosed, however, under certain circumstances, could be applied to other glass sheets to achieve a film of uniform transmittance of visible light over any or all portions of the glass if desired and such filming procedures are considered to be within the scope of the present invention.

Figure 18:
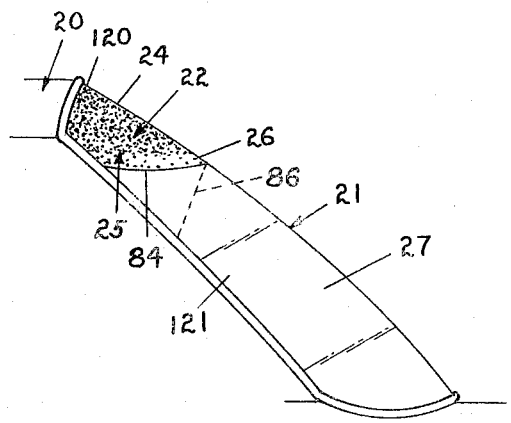
FIG. 18 is a side elevation view of the filmed rear window shown in FIG. 17.

The automobile rear window 21 in FIGS. 1 and 18, which may be of any desired configuration or contour as before noted, is sprayed with a filming solution so that the upper window portion, adjacent upper edge 120 where the rear window 21 curves forwardly to blend into the roof of the car, is filmed. The side portions of the back windows also curve upwardly or inwardly to form wings 121 that blend into the sides of the car body and these wings 121 are also filmed near the upper window edge 120. As before described, these wings 121 receive a uniform spray because of the contour bars 83a and 83b which cause the spray guns 79 to distribute the spray uniformly over the interior surface 23 of the glass sheet.

It is to be understood however that the filming technique of the present invention is not restricted to the filming of any particular type of glass but may be used to produce a filmed band on regular or clear glass or on glass already having a filmed, shaded or tinted portion.

By using suitable filming solutions and controlling the film thickness, for example, by exercising proper control over the various above-discussed steps of the filming process, almost any desired daylight transmittance values can be secured for the film in area 24 and in area 26. This control over the film thickness, to gain control of the transmittance of light, will also afford the desired control of the cooperating solar radiation reflectance which likewise to a degree is a result of film thickness.

Generally speaking, however, for utility it has been found desirable to use a liquid spray solution which when employed according to the above-discussed process on clear glass or regular plate glass will produce a sprayed glass sheet wherein the major portion of the sheet filmed, or the filmed area 24 of greatest intensity, will have a daylight transmittance of between 28% and 36% and preferably 30% and a solar reflectance of between 23% and 18% and preferably 22% measured from the unfilmed side. For special glass, for example, heat-absorbing glass, the film will produce a glass sheet wherein this filmed area 24 of the greatest thickness will have a daylight transmittance of between 22% and 31% and preferably 24% and a solar reflectance of between 13% and 10% and preferably 12% measured from the unfilmed side. Such a filmed window when employed as the rear window of an automobile would afford to the user the optimum results for both light transmittance and solar reflectance as hereinbefore described. It being understood that the values above are for the area 24 receiving the maximum filming and that in the fade-out area 26 the light transmittance will increase gradually and progressively until, at the termination point 84 of the film it will reach 87–88%, the clarity of clear glass, or 72–76% in the case of special glass such as heat-absorbing glass. It is further understood that the value, above discussed, of solar radiation reflectance will decrease in a similar manner, that is, gradually and progressively through the fade-out area 26 from the maximum in area 24, until at or about the termination point 84 of the filmed area 26 it will substantially be equal to the solar radiation reflectance value of clear glass 8%, or 6% in the case of special glass referred to as heat-absorbing glass.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

We claim:

1. A method of producing a bent, tempered and filmed glass sheet by depositing a film forming compound onto the heated sheet from a spray source, comprising heating a flat sheet to bending temerature and forming a concave curvature in said sheet, rapidly cooling the bent sheet to a temperature below said bending temperature and above the temperature required to form said film so as to temper said bent sheet, moving said spray source back and forth across said bent sheet a predetermined distance from the sheet and substantially following the concave curvature thereof, and spraying the film forming compound from said moving spray source onto the concave surface of said bent sheet.

2. A method of producing a bent, tempered and filmed glass sheet as claimed in claim 1, wherein the axis of said spray source is aimed slightly in advance of an edge of said sheet so as to form said film in a graded band along said edge.

3. An apparatus for forming a film of low light transmittance and high solar radiation reflectance on a surface of a bent and tempered glass sheet, including means for supporting the glass sheet, means for conveying said sheet supporting means along a predetermined substantially horizontal path normal to the longitudinal axis of the sheet, means for heating the sheet as it advances along the conveying means and while supported in said sheet supporting means to bend the sheet to a desired configuration, means for rapidly cooling the sheet to temper said sheet as it advances along the conveying means and while supported in said sheet supporting means, means for arresting the forward movement of said sheet supporting means along the path of the conveying means and maintaining the supporting means and sheet thereon in a predetermined position, while the sheet is supported on said sheet supporting means and immediately after emerging from said sheet cooling means, and spray means traversing a path across the full length of the bent sheet and following the contour thereof to maintain substantially constant spacing between said spray means and said bent sheet.

4. Apparatus for forming a film on the concave surface of a bent and tempered glass sheet immediately after the bending and tempering thereof and while the residual heat in the sheet from the bending and tempering is sufficient to form said film, comprising means for supporting the bent sheet in substantially horizontal position with its concave surface directed upwardly, a movable carriage mounted above said sheet, spray dispersing means carried by said movable carriage for depositing a film forming compound on said surface, means for moving said carriage back and forth in traversing movement from end to end of said sheet, and means causing said carriage and spray dispersing means thereon to substantially follow the contour of said concavely curved sheet in moving from end to end thereof.

5. Apparatus for forming a film on a bent and tempered glass sheet as claimed in claim 4, wherein said spray dispersing means includes a spray nozzle disposed at an acute angle to the horizontal with the apex of the spray directed in advance of the lead edge of the sheet as it traverses said sheet whereby the film is deposited in a graded band along the lead edge of said sheet, the intensity of said graded band being greatest along said lead edge and decreasing gradually toward the interior of the sheet.

6. Apparatus for forming a film on a bent and tempered glass sheet as claimed in claim 4, including a pair of spaced contoured cam bars extending longitudinally of said bent sheet, and rollers affixed to said movable carriage and engaging said cam bars, said carriage being suspended from the cam bars and the curvature of said cam bars being such as to cause said carriage to follow the contour of said curved sheet in moving from end to end thereof.

7. Apparatus for forming a film on a bent and tempered glass sheet as claimed in claim 4, including a walking beam from which said carriage is suspended, a pair of rollers on one end of said walking beam engaging one of said contour bars, and a pair of rollers on the other end of said walking beam engaging the other of said contour bars, the curvature of said cam bars being such as to cause said carriage to follow the contour of said concavely curved sheet in moving from end to end thereof.

8. Apparatus for forming a film on a bent and tempered glass sheet as claimed in claim 7, wherein said spray dispersing means includes a spaced pair of spray nozzles pivotally mounted upon said carriage, and means linking said spray nozzles to said walking beam to cause said nozzles to swing about said pivotal mounting and maintain a substantially uniform angular relationship with said concave surface in moving from end to end thereof.

9. An apparatus for forming bent, tempered and filmed glass sheets, including means for supporting the glass sheet, means for conveying the sheet supporting means along a predetermined path normal to the longitudinal axis of the sheet, means for heating the sheet as it passes along the conveying means and while supported in said sheet supporting means to bend the sheet to a desired contour, means for rapidly cooling the sheet to temper said sheet as it advances along the conveying means and while supported in said sheet supporting means, spray means adapted to traverse the width of said sheet to apply a film forming compound across the bent sheet immediately upon emerging from said sheet cooling means and while the sheet is supported in said sheet supporting means, and means for arresting the movement of said sheet supporting means to maintain the glass sheet in a stationary position during the operation of said spray means to apply the film solution to the sheet, said spray means including at least one spray nozzle disposed at an acute angle to the horizontal with the apex of the spray directed in advance of the lead edge of the stationary sheet as it traverses said sheet, whereby the film is deposited in a graded band along the lead edge of said sheet, the intensity of said graded band being greatest along said lead edge and decreasing toward the interior of said sheet.

References Cited by the Examiner
UNITED STATES PATENTS 2,236,911  4/1941  Long _____ 65—60 X
3,078,693  2/1963  Lytle _____ 65—60

DONALL H. SYLVESTER, *Primary Examiner.*

A. D. KELLOGG, *Assistant Examiner.*